(12) United States Patent
Sim et al.

(10) Patent No.: US 12,363,302 B2
(45) Date of Patent: *Jul. 15, 2025

(54) METHOD AND APPARATUS FOR INTRA-PREDICTION CODING OF VIDEO DATA

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Joo Hyung Byeon, Seoul (KR); Sea Nae Park, Seoul (KR); Jun Taek Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Corporation, Seoul (KR); Kwangwoon University Industry-Academic Collaboration Foundation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/413,952

(22) Filed: Jan. 16, 2024

(65) Prior Publication Data

US 2024/0171747 A1    May 23, 2024

Related U.S. Application Data

(63) Continuation of application No. 17/633,030, filed as application No. PCT/KR2020/010371 on Aug. 6, 2020, now Pat. No. 11,930,180.

(30) Foreign Application Priority Data

Aug. 6, 2019  (KR) .................. 10-2019-0095449
Aug. 9, 2019  (KR) .................. 10-2019-0097449
Aug. 5, 2020  (KR) .................. 10-2020-0098223

(51) Int. Cl.
  *H04N 19/132*   (2014.01)
  *H04N 19/105*   (2014.01)
  (Continued)

(52) U.S. Cl.
  CPC ......... *H04N 19/132* (2014.11); *H04N 19/105* (2014.11); *H04N 19/159* (2014.11);
  (Continued)

(58) Field of Classification Search
  None
  See application file for complete search history.

(56) References Cited

U.S. PATENT DOCUMENTS

2016/0366422 A1   12/2016   Yin et al.
2017/0272748 A1   9/2017    Seregin et al.
(Continued)

FOREIGN PATENT DOCUMENTS

KR    10-2017-0069328 A    6/2017
KR    10-2018-0122361 A    11/2018
(Continued)

OTHER PUBLICATIONS

Extended European Search Report for European Patent Application No. 20850849.9, dated Jan. 30, 2023, 10 pages.
(Continued)

*Primary Examiner* — James M Anderson, II
(74) *Attorney, Agent, or Firm* — Fox Rothschild LLP

(57) ABSTRACT

A method and an apparatus are configured for intra prediction coding of video data. An apparatus for decoding video data includes: a decoding unit which obtains, from a bitstream, information on a luma prediction mode and information on a chroma prediction mode of a current coding block; and an intra prediction unit which generates luma
(Continued)

prediction samples and chroma prediction samples of the current coding block. The intra prediction unit derives a luma intra prediction type and a luma intra prediction mode of the current coding block on the basis of the information on the luma prediction mode, and determines a chroma intra prediction mode of the current coding block on the basis of the luma intra prediction type and the luma intra prediction mode of the current coding block, and the information on the chroma prediction mode.

3 Claims, 7 Drawing Sheets

(51) Int. Cl.
　　*H04N 19/159* 　　(2014.01)
　　*H04N 19/176* 　　(2014.01)
　　*H04N 19/186* 　　(2014.01)
　　*H04N 19/70* 　　(2014.01)
(52) U.S. Cl.
　　CPC ......... *H04N 19/176* (2014.11); *H04N 19/186* (2014.11); *H04N 19/70* (2014.11)

(56) References Cited

U.S. PATENT DOCUMENTS

| | | |
|---|---|---|
| 2017/0272759 A1 | 9/2017 | Seregin et al. |
| 2021/0136395 A1 | 5/2021 | Jun et al. |
| 2022/0201301 A1* | 6/2022 | Xiu ............... H04N 19/105 |
| 2023/0188720 A1* | 6/2023 | Pfaff ............... H04N 19/186 |
| | | 375/240.02 |

FOREIGN PATENT DOCUMENTS

| | | |
|---|---|---|
| KR | 10-2019-0067732 A | 6/2019 |
| WO | 2021/134072 A1 | 7/2021 |
| WO | 2021/198402 A1 | 10/2021 |

OTHER PUBLICATIONS

Lin et al., "CE3-related: MIP with simplified mode index coding", Joint Video Experts Team (JVET) of ITU-T SG 16 WP 3 and ISO/IEC JTC 1/SC 29/WG 11, 15th Meeting: Gothenburg, SE (Jul. 3-12, 2019), 5 pages.

Pfaff, J. et al., "MIP for all channels in the case of 4:4:4-chroma format and of single tree", Joint Video Experts Team (JVET) of ITU-T SG 16 WP 3 and ISO/IEC JTC 1/SC 29/WG 11, 18th Meeting: Alpbach, AT (Apr. 15-24, 2020) 6 pages.

B. Bross et al., Joint Video Experts Team (JVET) of ITU-T SG 16 WP 3 and ISO/IEC JTC 1/SC 29/WG 11, 15th Meeting Gothenberg, SE, Jul. 3-12, 2019.

* cited by examiner

METHOD AND APPARATUS FOR INTRA-PREDICTION CODING OF VIDEO DATA

CROSS-REFERENCE TO RELATED APPLICATION

This Application is a Continuation of application Ser. No. 17/633,030 filed on Feb. 4, 2022. U.S. application Ser. No. 17/633,030 is a National Phase application filed under 35 USC 371 of PCT International Application No. PCT/KR2020/010371, with an International Filing Date of Aug. 6, 2020, which claims priority to Korean Patent Application No. 10-2020-0098223 filed on Aug. 5, 2020, Korean Patent Application No. 10-2019-0097449 filed on Aug. 9, 2019, and Korean Patent Application No. 10-2019-0095449 filed on Aug. 6, 2019. The entire contents of these applications are incorporated herein by reference in their entirety.

BACKGROUND

(a) Technical Field

The present disclosure relates to encoding and decoding of video data.

(b) Description of the Related Art

Since the volume of video data typically is larger than that of voice data or still image data, storing or transmitting video data without processing for compression requires a significant amount of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for video include H.264/AVC and High Efficiency Video Coding (HEVC), which improves coding efficiency over H.264/AVC by about 40%.

However, for video data, picture size, resolution, and frame rate are gradually increasing, and accordingly the amount of data to be encoded is also increasing. Accordingly, a new compression technique having better encoding efficiency and higher image quality than the existing compression technique is required.

SUMMARY

The present disclosure discloses improved techniques for intra-prediction coding of a block of video data.

In accordance with one aspect of the present disclosure, a method for decoding video data, the method comprises: acquiring, from a bitstream, information on a luma prediction mode and information on a chroma prediction mode of a current coding block; deriving a luma intra prediction type and luma intra prediction mode of the current coding block based on the information on the luma prediction mode, the luma intra prediction type comprising matrix-based intra prediction (MIP) and regular intra prediction; determining a chroma intra prediction mode of the current coding block, based on the luma intra prediction type and luma intra prediction mode of the current coding block and the information on the chroma prediction mode; and generating chroma prediction samples of the current coding block based on the chroma intra prediction mode of the current coding block.

The determining of a chroma intra prediction mode of the current coding block comprises, if the information on the chroma prediction mode indicates DM (Direct mode), the luma intra prediction type of the current coding block is the matrix-based intra prediction, and a sampling format of the video data is 4:4:4, determining that the chroma intra prediction type of the current coding block is the matrix-based intra prediction, and determining that the chroma intra prediction mode corresponding to the chroma intra prediction type of the current coding block is the same as a matrix-based intra prediction mode derived as the luma intra prediction mode of the current coding block.

The determining of a chroma intra prediction mode of the current coding block comprises, if the information on the chroma prediction mode indicates a DM (Direct mode), the luma intra prediction type of the current coding block is the matrix-based intra prediction, and the sampling format of the video data is 4:2:0 or 4:2:2, determining that the chroma intra prediction mode of the current coding block is a PLANAR mode.

The determining of a chroma intra prediction mode of the current coding block comprises, if the information on the chroma prediction mode indicates a DM (Direct mode) and the luma intra prediction type of the current coding block is the regular intra prediction type, determining that the chroma intra prediction mode of the current coding block is the same as a regular intra prediction mode derived as the luma intra prediction mode of the current coding block.

In accordance with another aspect of the present disclosure, an apparatus for decoding video data comprises: a decoding unit which acquires, from a bitstream, information on a luma prediction mode and information on a chroma prediction mode of a current coding block; and an intra prediction unit which derives a luma intra prediction type and luma intra prediction mode of the current coding block based on the information on the luma prediction mode, determines a chroma intra prediction mode of the current coding block based on the luma intra prediction type and luma intra prediction mode of the current coding block and the information on the chroma prediction mode, and generates chroma prediction samples of the current coding block based on the chroma intra prediction mode of the current coding block, wherein the luma intra prediction type comprises matrix-based intra prediction (MIP) and regular intra prediction.

In the determining of a chroma intra prediction mode of the current coding block, if the information on the chroma prediction mode indicates a DM (Direct mode), the luma intra prediction type of the current coding block is the matrix-based intra prediction, and a sampling format of the video data is 4:4:4, the intra prediction unit determines that the chroma intra prediction type of the current coding block is the matrix-based intra prediction, and determines that the chroma intra prediction mode corresponding to the chroma intra prediction type of the current coding block is the same as a matrix-based intra prediction mode derived as the luma intra prediction mode of the current coding block.

DETAILED DESCRIPTION

Figure 1:
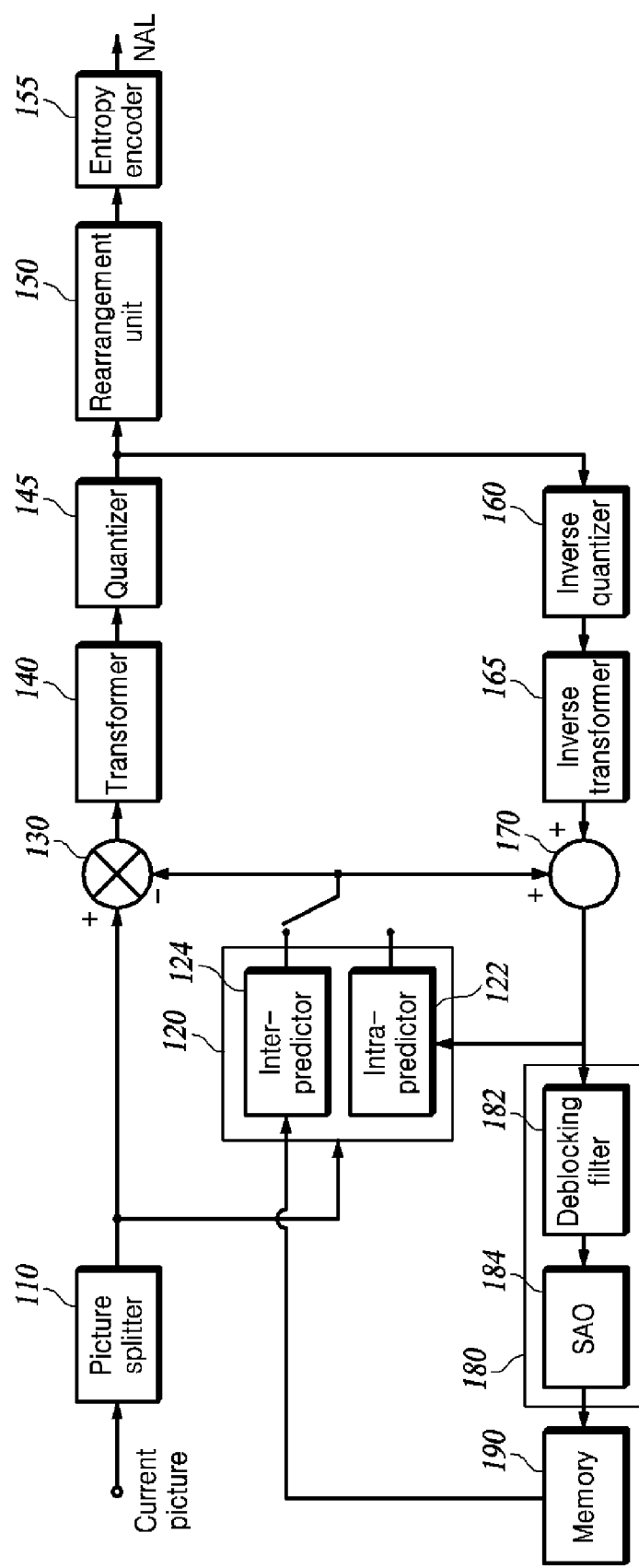
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a picture splitter 110, a predictor 120, a subtractor 130, a transformer 140, a quantizer 145, a rearrangement unit 150, an entropy encoder 155, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video includes a plurality of pictures. Each picture is split into a plurality of regions, and encoding is performed on each region. For example, one picture is split into one or more tiles or/and slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting a picture is encoded in a picture parameter set (PPS) or a picture header. Furthermore, information which a plurality of pictures refers to in common is encoded in a sequence parameter set (SPS). In addition, information referred to by one or more SPSs in common is encoded in a video parameter set (VPS). Information applied to one tile or tile group in common may be encoded as a syntax of a tile or tile group header.

The picture splitter 110 is configured to determine the size of a coding tree unit (CTU). Information about the size of the CTU (CTU size) is encoded as a syntax of the SPS or PPS and is transmitted to the video decoding apparatus.

The picture splitter 110 is configured to split each picture constituting the video into a plurality of CTUs having a predetermined size, and then recursively split the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
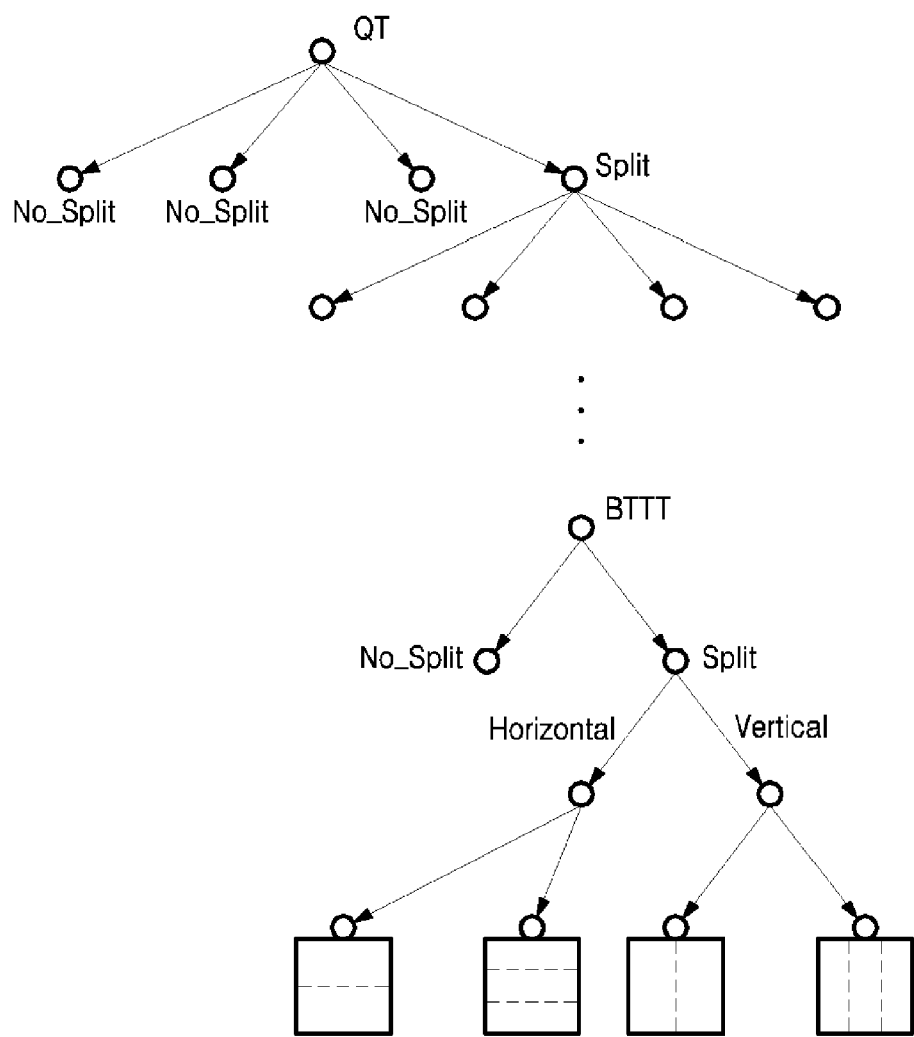
FIG. 2 exemplarily shows a block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular.

The predictor 120 is configured to predict the current block to generate a prediction block. The predictor 120 includes an intra-predictor 122 and an inter-predictor 124.

In general, each of the current blocks in a picture may be predictively coded. In general, prediction of a current block is performed using an intra-prediction technique (using data from a picture containing the current block) or an inter-prediction technique (using data from a picture coded before a picture containing the current block). The inter-prediction includes both unidirectional prediction and bi-directional prediction.

The intra-prediction unit 122 is configured to predict pixels in the current block using pixels (reference pixels) positioned around the current block in the current picture including the current block. There is a plurality of intra-prediction modes according to the prediction directions. For example, as shown in FIG. 3, the plurality of intra-prediction modes may include two non-directional modes, which include a PLANAR mode and a DC mode, and 65 directional modes. Neighboring pixels and an equation to be used are defined differently for each prediction mode. The table below lists intra-prediction mode numbers and names thereof.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |

Figure 3A:
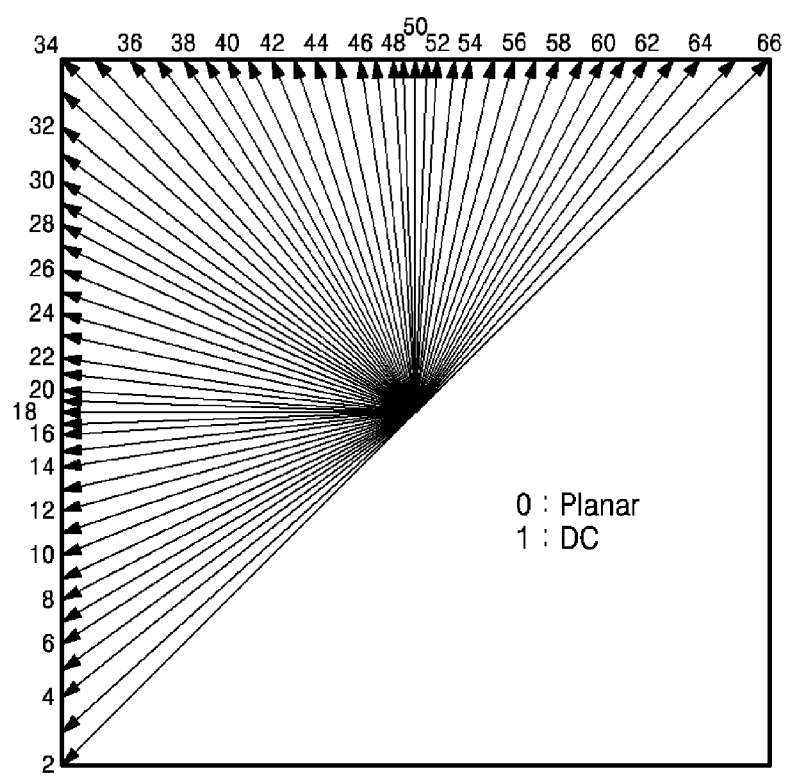
FIG. 3A exemplarily shows a plurality of intra-prediction modes.
Figure 3B:
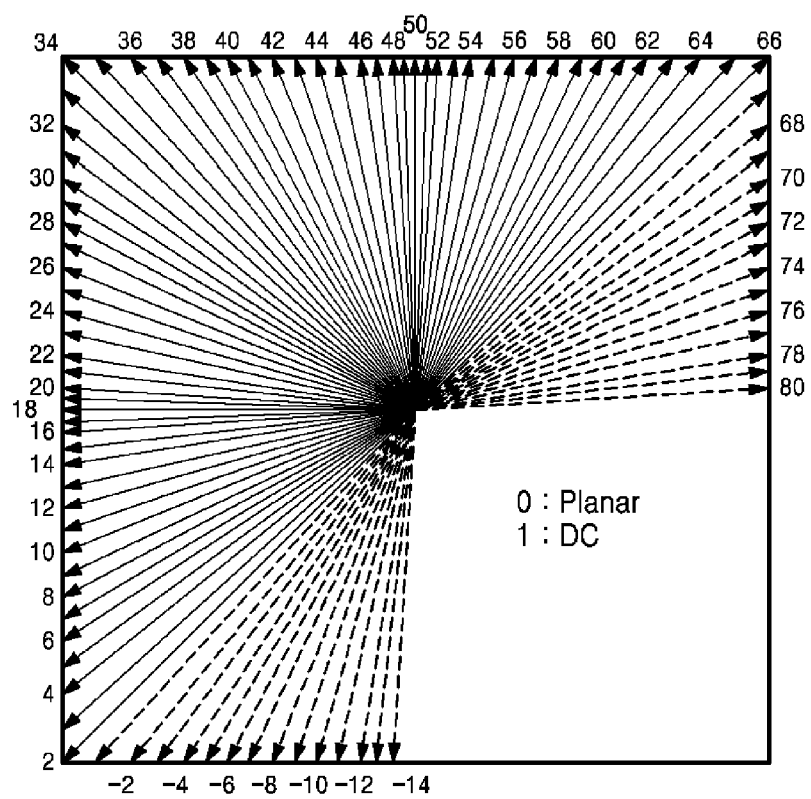
FIG. 3B exemplarily shows a plurality of intra prediction modes including wide-angle intra prediction modes.

For efficient directional prediction for a rectangular-shaped current block, directional modes (intra-prediction modes 67 to 80 and −1 to −14) indicated by dotted arrows in FIG. 3B may be additionally used. These modes may be referred to as "wide angle intra-prediction modes." In FIG. 3B, arrows indicate corresponding reference samples used for prediction, not indicating prediction directions. The prediction direction is opposite to the direction indicated by an arrow. A wide-angle intra prediction mode is a mode in which prediction is performed in a direction opposite to a specific directional mode without additional bit transmission when the current block has a rectangular shape. In this case, among the wide angle intra-prediction modes, some wide angle intra-prediction modes available for the current block may be determined based on a ratio of a width and a height of the rectangular current block. For example, wide angle intra-prediction modes with an angle less than 45 degrees (intra prediction modes 67 to 80) may be used when the current block has a rectangular shape with a height less than the width thereof. Wide angle intra-prediction modes with an angle greater than −135 degrees (intra-prediction modes −1 to −14) may be used when the current block has a rectangular shape with the height greater than the width thereof.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 is configured to select one intra-prediction mode from among the plurality of intra-prediction modes, and predicts the current block using neighboring pixels (reference pixels) and an equation determined according to the selected intra-prediction mode. Information about the selected intra-prediction mode is encoded by the entropy encoder 155 and transmitted to the video decoding apparatus.

In addition, the intra-predictor 122 may generate a prediction block for the current block, using matrix-based intra-prediction (MIP), which will be described later. The intra-predictor 122 generates a prediction block for the current block using a boundary vector derived from samples reconstructed on the left side of the current block and samples reconstructed above the current block, a predefined matrix, and an offset vector.

The inter-predictor 124 is configured to generate a prediction block for the current block through motion compensation. The inter-predictor 124 may search for a block most similar to the current block in a reference picture which has been encoded and decoded earlier than the current picture, and generate a prediction block for the current block using the searched block. Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The subtractor 130 is configured to subtract the prediction block generated by the intra-predictor 122 or the inter-predictor 124 from the current block to generate a residual block.

The transformer 140 may split the residual block into one or more transform blocks, and applies the transformation to the one or more transform blocks, thereby transforming the residual values of the transform blocks from the pixel domain to the frequency domain. In the frequency domain, the transformed blocks are referred to as coefficient blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may transform residual signals in the residual block using the entire size of the residual block as a transformation unit. In addition, the transformer 140 may partition the residual block into two sub-blocks in a horizontal or vertical direction, and may transform only one of the two sub-blocks. Accordingly, the size of the transform block may be different from the size of the residual block (and thus the size of the prediction block). Non-zero residual sample values may not be present or may be very rare in the untransformed subblock. The residual samples of the untransformed subblock are not signaled, and may be inferred as "0" by the video decoding apparatus. There may be multiple partition types according to the partitioning direction and partitioning ratio. The transformer 140 may provide information about the coding mode (or transform mode) of the residual block (e.g., information indicating whether the residual block is transformed or the residual subblock is transformed, and information indicating the partition type selected to partition the residual block into subblocks, and information identifying a subblock that is transformed is performed) to the entropy encoder 155. The entropy encoder 155 may encode the information about the coding mode (or transform mode) of the residual block.

The quantizer 145 is configured to quantize transform coefficients output from the transformer 140, and output the quantized transform coefficients to the entropy encoder 155. For some blocks or frames, the quantizer 145 may directly quantize a related residual block without transformation.

The rearrangement unit 150 may reorganize the coefficient values for the quantized residual value. The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. That is, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using various encoding techniques such as Context-based Adaptive Binary Arithmetic Code (CABAC) and exponential Golomb, to generate a bitstream.

The entropy encoder 155 may encode information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 may encode information about a prediction type indicating whether the current block is encoded by intra-prediction or inter-prediction, and encode intra-prediction information (i.e., information about an intra-prediction mode) or inter-prediction information (information about a reference picture index and a motion vector) according to the prediction type.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstructs the residual block.

The adder 170 is configured to add the reconstructed residual block to the prediction block generated by the predictor 120 to reconstruct the current block. The pixels in the reconstructed current block are used as reference pixels in performing intra-prediction of a next block.

The filter unit 180 is configured to filter the reconstructed pixels to reduce blocking artifacts, ringing artifacts, and blurring artifacts generated due to block-based prediction and transformation/quantization. The filter unit 180 may include a deblocking filter 182 and a pixel adaptive offset (SAO) filter 184.

The deblocking filter 182 is configured to filter the boundary between the reconstructed blocks to remove blocking artifacts caused by block-by-block coding/decoding, and the SAO filter 184 is configured to perform additional filtering on the deblocking-filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture may be used as a reference picture for inter-prediction of blocks in a picture to be encoded next.

Figure 4:
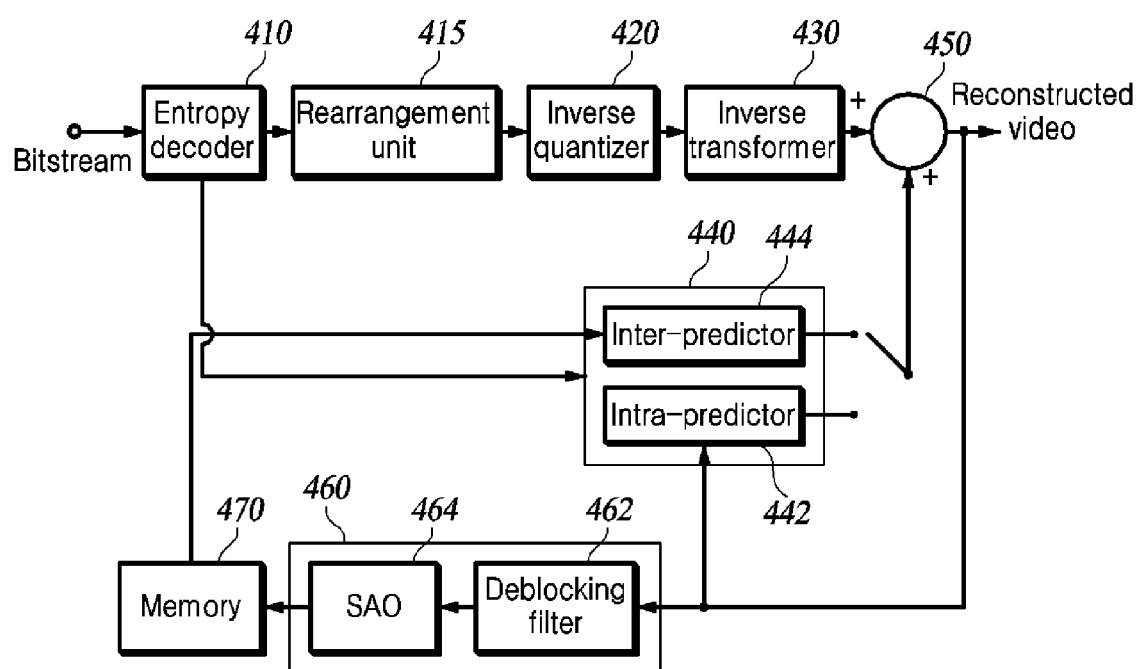
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include an entropy decoder 410, a rearrangement unit 415, an inverse quantizer 420, an inverse transformer 430, a predictor 440, an adder 450, a filter unit 460, and a memory 470.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 410 is configured to determine a current block to be decoded by decoding a bitstream generated by the video encoding apparatus and extracting information related to block splitting, and extract prediction information and information about a residual signal, and the like required to reconstruct the current block.

The entropy decoder 410 is configured to extract information about the CTU size from the sequence parameter set (SPS) or the picture parameter set (PPS), determine the size of the CTU, and split a picture into CTUs of the determined size. Then, the decoder is configured to determine the CTU as the uppermost layer, that is, the root node of a tree structure, and extract splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Thereby, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 410 is configured to extract information about a prediction type indicating whether the current block is intra-predicted or inter-predicted. When the prediction type information indicates intra-prediction, the entropy decoder 410 is configured to extract a syntax element for the intra-prediction information (intra-prediction mode) for the current block. When the prediction type information indicates inter-prediction, the entropy decoder 410 is configured to extract a syntax element for the inter-prediction information, that is, information indicating a motion vector and a reference picture referred to by the motion vector.

The entropy decoder 410 is configured to extract information about the coding mode of the residual block (e.g., information about whether the residual block is encoded only a subblock of the residual block is encoded, information indicating the partition type selected to partition the residual block into subblocks, information identifying the encoded residual subblock, quantization parameters, etc.) from the bitstream. The entropy decoder 410 also is configured to extract information about quantized transform coefficients of the current block as information about the residual signal.

The rearrangement unit 415 may change the sequence of the one-dimensional quantized transform coefficients entropy-decoded by the entropy decoder 410 to a 2-dimensional coefficient array (i.e., block) in a reverse order of the coefficient scanning performed by the video encoding apparatus.

The inverse quantizer 420 is configured to inversely quantize the quantized transform coefficients. The inverse transformer 430 is configured to inversely transform the inversely quantized transform coefficients from the frequency domain to the spatial domain based on information about the coding mode of the residual block to reconstruct residual signals, thereby generating a reconstructed residual block for the current block When the information about the coding mode of the residual block indicates that the residual block of the current block has been coded by the video encoding apparatus, the inverse transformer 430 uses the size of the current block (and thus the size of the residual block to be reconstructed) as a transform unit for the inverse quantized transform coefficients to perform inverse transform to generate a reconstructed residual block for the current block.

When the information about the coding mode of the residual block indicates that only one subblock of the residual block has been coded by the video encoding apparatus, the inverse transformer 430 uses the size of the transformed subblock as a transform unit for the inverse quantized transform coefficients to perform inverse transform to reconstruct the residual signals for the transformed subblock, and fills the residual signals for the untransformed subblock with a value of "0" to generate a reconstructed residual block for the current block.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 is configured to determine an intra-prediction mode of the current block among a plurality of intra-prediction modes based on the syntax element for the intra-prediction mode extracted from the entropy decoder 410, and predict the current block using the reference pixels around the current block according to the intra-prediction mode. In addition, the intra-predictor 442 may generate a prediction block for the current block, using matrix-based intra-prediction (MIP), which will be described later. The intra-predictor 422 may generate a prediction block for the current block using a boundary vector derived from samples reconstructed on the left side of the current block and samples reconstructed at the above of the current block, and a predefined matrix and offset vector.

The inter-predictor 444 is configured to determine a motion vector of the current block and a reference picture referred to by the motion vector using the syntax element for the intra-prediction mode extracted from the entropy decoder 410, and predict the current block based on the motion vector and the reference picture.

The adder 450 is configured to reconstruct the current block by adding the residual block output from the inverse transformer and the prediction block output from the inter-predictor or the intra-predictor. The pixels in the reconstructed current block are used as reference pixels in intra-predicting a block to be decoded next.

The filter unit 460 may include a deblocking filter 462 and an SAO filter 464. The deblocking filter 462 is configured to deblock-filter the boundary between the reconstructed blocks to remove blocking artifacts caused by block-by-block decoding. The SAO filter 464 can perform additional filtering on the reconstructed block after deblocking filtering to corresponding offsets so as to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of blocks in a picture to be encoded next.

The techniques of the present disclosure generally are related to intra-prediction coding. The following description is mainly focused on decoding techniques, that is, the operations of the video decoder. The encoding techniques are briefly described because they are opposite to the decoding techniques that are comprehensively described.

In the discussion of the Next-generation Video Coding standard (i.e., Versatile Video Coding (VVC)), several new coding tools enabling better coding performance than the High Efficiency Video Coding (HEVC) have been introduced.

Matrix-based Intra-prediction (MIP) is a new intra-prediction technique introduced in VTM 5.0. The original idea is to use a neural network-based intra-prediction technique, that is, to use a multilayer neural network to predict current PU pixel values based on adjacent reconstructed pixels. However, due to the high complexity of the prediction method using the neural network, an intra-prediction technique based on affine linear transform using pre-trained matrices has been introduced.

To predict a rectangular block PU with a width W and a height H, the MIP takes as inputs H reconstructed samples on the left of the block and W reconstructed samples on the above of the block. The final predicted pixels are obtained by averaging, matrix-vector multiplication, linear interpolation, and the like.

The sizes of blocks to which MIP is applied are classified into three categories as follows.

$$idx(W, H) = \begin{cases} 0 & \text{for } W = H = 4 \\ 1 & \text{for max (W, H) = 8} \\ 2 & \text{for max (W, H) > 8} \end{cases}$$

According to idx(W,H), the number of MIP modes (numModes), boundary size (boundarySize), and prediction block size (predW, predH, predC) are defined as follows. In the table below, MipSizeId=idx(W,H).

TABLE 2

| MipSizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min(nTbW, 8) | Min(nTbH, 8) | 8 |

Figure 5:
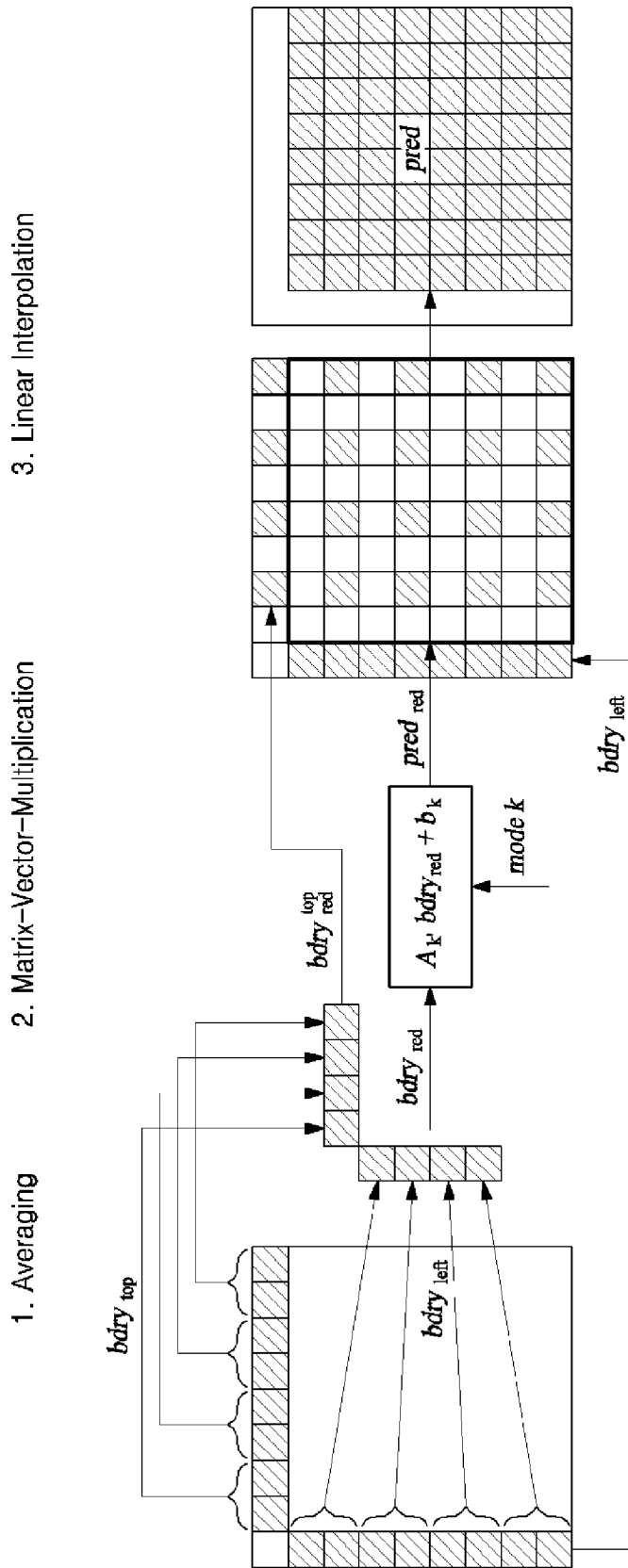
FIG. 5 is a conceptual diagram illustrating the main process of MIP technology that may be used in the techniques of the present disclosure.

FIG. 5 is a conceptual diagram illustrating the main processes of MIP technology that may be used in the techniques of the present disclosure.

(1) Averaging

The main purpose of this process is to normalize the reference samples. Depending on the block size and shape (width and height) (i.e., MipSizeId), 4 or 8 samples are obtained. When both the width and height of the current block are 4 (i.e., W=H=4), 4 samples in total, including 2 from the left and 2 from the above, are obtained (boundarySize=2). In the other case, 8 samples in total, including 4 from the left and 4 from the above, are obtained (boundarySize=4).

As shown in FIG. 5, the above neighboring samples are denoted by $bdry^{top}$ and the left neighboring samples are denoted by $bdry^{left}$. By performing the averaging on $bdry^{top}$ and $bdry^{left}$, respectively, down-sampled sample sets $bdry_{red}^{top}$ and $bdry_{red}^{left}$ are obtained. The averaging is a downsampling process as follows.

$$redS[x] = (\Sigma_{i=0}^{bDwn-1} refS[x*bDwn+i] + (1 << (\log_2(bDwn)-1))) >> \log_2(bDwn)$$

In the equation above, bDwn denotes a downsampling scale value (nTbs/boundarySize), and refS denotes an original reference sample. The calculated redS is stored as $bdry_{red}^{left}$ for the left neighbors and as $bdry_{red}^{top}$ for the above neighbors.

The down-sampled reference samples are stitched into a vector of length 4 or 8. The reduced boundary vector $bdry_{red}$ which is input to the vector-matrix multiplication is defined as the equation below. For example, when W=H=4 and the MIP mode is less than 18, the boundary vector is constructed by stitching in order of $bdry_{red}^{left}$ and $bdry_{red}^{top}$. When W=H=4 and the MIP mode is greater than or equal to 18, they are stitched in order of $bdry_{red}^{left}$ $bdry_{red}^{top}$. In the following equation, "mode" denotes the MIP mode.

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for max } (W, H) = 8 \text{ and mode} < 10 \\ [bdry_{red}^{left}, bdry_{red}^{top}] & \text{for max } (W, H) = 8 \text{ and mode} \geq 10 \\ [bdry_{red}^{top}, bdry_{red}^{left}] & \text{for max } (W, H) > 8 \text{ and mode} < 6 \\ [bdry_{red}^{left}, bdry_{red}^{top}] & \text{for max } (W, H) > 8 \text{ and mode} \geq 6 \end{cases}$$

(2) Matrix-Vector Multiplication

In this process, a down-sampled prediction signal $pred_{red}$ of the current block is generated from the reduced boundary vector $pred_{red}$ is the sum of the matrix-vector product and the offset and may be calculated as follows.

$$pred_{red} = A \cdot bdry_{red} + b$$

The size of $pred_{red}$ is $W_{red} \times H_{red}$. $W_{red}$ and $H_{red}$ are defined according to the size and shape of the current block as shown below. Matrix A has rows as many as $W_{red} * H_{red}$, and has 4 columns when W=H=4 or 8 columns in the other cases. The offset vector b is a vector of size $W_{red} * H_{red}$.

$$W_{red} = \begin{cases} 4 & \text{for max } (W, H) \leq 8 \\ \min(W, 8) & \text{for max}(W, H) > 8 \end{cases}$$

$$H_{red} = \begin{cases} 4 & \text{for max } (W, H) \leq 8 \\ \min(H, 8) & \text{for max}(W, H) > 8 \end{cases}$$

Sets $S_0$, $S_1$, and $S_2$ of the matrix A and the offset vector b that may be used for the coding block are predefined for each category of coding block sizes. The indices (0, 1, 2) of the set S are selected according to the aforementioned MipSizeId (i.e., idx(W,H)), and the matrix A and the offset vector b are extracted from one of the sets $S_0$, $S_1$, and $S_2$ according to the MIP mode applied to the current block.

The set $S_0$ consists of 18 matrices $A_0$ each having 16 rows and 4 columns, and 18 16-dimensional offset vectors $b_0$, and is used for a 4×4 block. The set $S_1$ consists of 10 matrices $A_1$ each having 16 rows and 8 columns and 10 16-dimensional offset vectors $b_1$, and is used for blocks of 4×8, 8×4 and 8×8 sizes. Finally, the set $S_2$ consists of 6 matrices $A_2$ each having 64 rows and 8 columns and 6 64-dimensional offset vectors $b_2$, and is used for all other block shapes.

(3) Pixel Interpolation

Interpolation is an upsampling process. As mentioned above, $pred_{red}$ is a down-sampled prediction signal of the original block. In this case, a down-sampled prediction block with a size of predW and predH is defined as follows.

$pred_{red}[x][y]$, with $x=0 \ldots predW$ 1,
$y=0 \ldots predH-1$

A prediction block having an original block size (nTbW, nTbH) generated by linearly interpolating the prediction signal at the remaining position in each direction is defined as follows.

predSamples[x][y], with $x=0 \ldots nTbW-1, y=0 \ldots nTbH-1$

Depending on the horizontal and vertical upsampling scale factors upHor(=nTbW/predW) and upVer (=nTbH/predH), some or all of the predSamples are filled from $pred_{red}$ as follows.

predSamples[(x+1)*upHor-1][(y+1)*upVer-1]=pre-
$d_{red}[x][y]$

When upHor=1, all horizontal positions of predSamples from $pred_{red}$ are filled. When upVer=1, all vertical positions of predSamples from $pred_{red}$ are filled.

Thereafter, the remaining empty samples of predSamples are filled through bi-linear interpolation. Interpolation in the horizontal direction and interpolation in the vertical direction are upsampling processes. For interpolation of left and top samples in predSamples, down-sampled samples $bdry_{red}^{top}$ are assigned to values of predSamples[x][−1], and original reference samples on the left are assigned to values of predSamples[−1][y]. The interpolation order is determined according to the size of the current block. That is, interpolation is first performed in the direction of the short size. Subsequently, interpolation is performed in the direction of the long size.

(4) Signaling of MIP Intra-Prediction Mode

For each coding unit (CU) subjected to intra-prediction coding, a flag indicating whether a matrix-based intra-prediction mode (i.e., MIP mode) is applied is transmitted. In VVC draft 5, for signaling the MIP mode, an MPM list consisting of 3 MPMs is used similarly to the traditional intra-prediction mode (hereinafter, "normal intra-prediction mode") which is different from the matrix-based intra-prediction. For example, intra_mip_mpm_flag, intra_mip_mpm_idx, and intra_mip_mpm_remainder are used for MIP mode signaling. intra_mip_mpm_idx is coded with a truncated binary code, and intra_mip_mpm_remainder is coded with a fixed length code.

Depending on the size of the coding block (CU), up to 35 MIP modes may be supported. For example, for a CU with max (W, H)<=8 and W*H<32, 35 modes are available. In addition, 19 prediction modes and 11 prediction modes are used for CUs with max(W, H)=8 and max(W, H)>8, respectively. In addition, a pair of modes (two modes) may share a matrix and offset vector to reduce memory requirements. The specific sharing mode is calculated as follows. For example, for a 4×4 coding block, mode 19 uses a transposed matrix of the matrix assigned to mode 2.

$$m = \begin{cases} mode & \text{for } W = H = 4 \text{ and } mode < 18 \\ mode-17 & \text{for } W = H = 4 \text{ and } mode \geq 18 \\ mode & \text{for } \max(W, H) = 8 \text{ and } mode < 10 \\ mode-9 & \text{for } \max(W, H) = 8 \text{ and } mode \geq 10 \\ mode & \text{for } \max(W, H) > 8 \text{ and } mode < 6 \\ mode-5 & \text{for } \max(W, H) > 8 \text{ and } mode \geq 6 \end{cases}$$

When there is a block to which MIP is applied adjacent to a block to which a regular intra-prediction mode other than MIP is applied (hereinafter referred to as a "regular block"), a mapping table defined between the MIP mode and the regular mode may be used for MPM derivation of the regular block. The mapping table is used to derive a regular mode of similar characteristics from the MIP mode of the neighboring block. The regular mode derived in this way is used for MPM derivation of the regular block. Similarly, even when MIP is applied to a collocated luma block used in chroma Direct Mode (DM) derivation, a regular mode mapped to the MIP mode of the collocated luma block is derived using the mapping table to determine an intra-prediction mode for the chroma block. The equation below expresses the mapping between the regular modes and the MIP modes.

predmode$_{MIP}$=map_regular_to_mip$_{idx}$[predmode$_{regular}$]

predmode$_{regular}$=map_mip_to_regular$_{idx}$[predmode$_{MIP}$]

The present disclosure proposes several modifications that can improve prediction performance while not significantly increasing the complexity of implementation of Matrix-based Intra prediction (MIP) technology.

Derivation of Matrix and Offset

According to one aspect of the present disclosure, a video encoder and a video decoder may create, from sets of matrices and offsets explicitly defined for some of MIP modes available for the size of a given block, new sets of matrices and offsets to be used for the remaining modes among the available MIP modes.

New sets of matrices and offsets may be obtained by performing at least one operation among transposition, an averaging operation, and a weighted averaging operation from two (or more) explicitly defined sets of matrices and offsets. The explicitly defined sets of matrices and offsets may be transmitted to the decoder by the encoder, or may be predefined in memories of both of the video encoder and the video decoder. According to this, memory requirements for storing sets of matrices and offsets for MIP modes may be additionally reduced without reducing the number of existing available modes.

For illustrative explanation, it is assumed that M matrices for the size of a given block are explicitly defined in the video encoder and the video decoder. The video encoder may derive (create) K new matrices from M matrices in a predefined manner, and accordingly, a total of (M+K) matrices may be used to perform matrix-based intra prediction for the given block. Each of the matrices in an available matrix list including the (M+K) matrices may be identified by their index.

If an MIP mode signaled for a current block from the video encoder is defined to use an explicitly defined matrix, the video decoder may directly use a matrix stored in the memory to perform matrix-based intra prediction on the current block. If the MIP mode signaled for the current block from the video encoder is defined to use a derived matrix, the video decoder may create the derived matrix for the signaled MIP mode in the same manner as the video encoder.

In some embodiments, the derived matrix may be an average matrix or weighted average matrix of two explicitly defined matrices. For example, let's assume that there are explicitly defined matrices A and B with a M×N size. For $$A = \begin{pmatrix} a_{11} & \cdots & a_{1N} \\ \vdots & \ddots & \vdots \\ a_{M1} & \cdots & a_{MN} \end{pmatrix},$$

$$B = \begin{pmatrix} b_{11} & \cdots & b_{1N} \\ \vdots & \ddots & \vdots \\ b_{M1} & \cdots & b_{MN} \end{pmatrix},$$

weighted average matrix C may be defined as follows.

$$C = (s_1 A + s_2 B)/(s_1 + s_2) =$$
$$\begin{pmatrix} (s_1 a_{11} + s_2 b_{11})/(s_1 + s_2) & \cdots & (s_1 a_{1N} + s_2 b_{1N})/(s_1 + s_2) \\ \vdots & \ddots & \vdots \\ (s_1 a_{M1} + s_2 b_{M1})/(s_1 + s_2) & \cdots & (s_1 a_{MN} + s_2 b_{MN})/(s_1 + s_2) \end{pmatrix}$$

where s1 and s2 are weights applied to Matrices A and B. The weights s1 and s2 may be predefined or signaled at a high-level syntax by the video encoder.

A new offset may be derived as well in the same manner as the derived matrix.

$$\vec{v}_C = (s_1 \vec{v}_A + s_2 \vec{v}_B)/(\vec{s}_1 + \vec{s}_2)$$

In some other embodiments, the derived matrix may be a transposed matrix of the weighted average matrix of the two explicitly defined matrices.

MIP Prediction of Chroma Component

In the discussion of standardization of VVC, five basic prediction modes (Planar mode, DC mode, Horizontal mode, Vertical mode, and DM (Direct Mode)) and three LM (Linear Model) modes were considered for intra prediction of a chroma block. The LM is also referred to as LM_Chroma mode or CCLM (Cross Component Linear Mode).

The LM mode is a mode in which a chroma signal is predicted from a luma signal by using the correlation between the luma signal and the chroma signal. In the LM mode, a linear model (LM) between pixel values of the luma signal and chroma signal is determined, and a prediction signal of the chroma block is calculated based on a reconstructed luma signal of a corresponding luma block by using the linear model. In the DM mode, the current chroma block uses the same prediction mode as the corresponding luma block.

If the LM mode (i.e., CCLM) is not applied to the chroma block, a syntax element (intra_chroma_pred_mode) specifying an intra prediction mode for the chroma block is coded. The intra prediction mode of the chroma block is determined as follows depending on intra chromapred mode and the intra prediction mode (lumaIntraPredMode) of the corresponding luma block. For example, if intra_chroma_pred_mode=4, the Direct Mode is used as the intra prediction mode of the chroma block, and accordingly, the intra prediction mode of the corresponding luma block is applied to the chroma block.

TABLE 3

| | lumaIntraPredMode | | | | |
|---|---|---|---|---|---|
| intra_chroma_pred_mode[ xCb ][ yCb ] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

In the discussion of VVC standardization, the matrix-based intra prediction (MIP) technology was introduced in such a way that only the luma component is used but not the chroma component, due to coding complexity, memory bandwidth caused by required sets of matrices and offsets, and so on. Accordingly, in VVC draft 5, in determining the intra prediction mode of the chroma block, when a corresponding luma block is coded by matrix-based intra prediction (MIP), the video encoder and the video decoder are configured to convert a MIP mode applied to the corresponding luma block into a regular intra prediction mode defined in a mapping table.

Hereinafter, several approaches for applying matrix-based intra prediction (MIP) to a chroma component will be proposed.

According to one aspect of the present disclosure, the video encoder and decoder may derive an MIP mode for blocks (chroma blocks) of chroma components from an MIP mode of a block (luma block) of a collocated luma component predicted by matrix-based intra prediction (MIP). Accordingly, for the chroma blocks coded by matrix-based intra prediction (MIP), the signaling of a syntax element explicitly specifying the MIP mode used by the encoder may be omitted.

According to one aspect of the present disclosure, instead of defining sets of matrices and offsets used for matrix-based intra prediction (MIP) separately for a chroma block and a luma block, sets of matrices and offsets defined for the luma block may be used for the chroma block as well, or sets of matrices and offsets to be used for the chroma block may be derived from the sets of matrices and offsets defined for the luma block, depending on a video sampling format (or chroma format). Table 4 shows a video sampling format indicated by a syntax element (sps chroma format idc; cIdx) signaled at an SPS level.

TABLE 4

| chroma_format_ide | Chroma format | SubWidthC | SubHeightC | MaxTsSizeC |
|---|---|---|---|---|
| 0 | Monochrome | 1 | 1 | — |
| 1 | 4:2:0 | 2 | 2 | MaxTsSize 2 |
| 2 | 4:2:2 | 2 | 1 | MaxTsSize 2 너비) MaxTsSize (높이) |
| 3 | 4:4:4 | 1 | 1 | MaxTsSize |

For example, if the video sampling format (or chroma format) is 4:4:4, the video encoder and the video decoder may use the sets of matrices and offsets defined for the luma block also for the chroma block.

For another example, if a luma component and a chroma component have different resolutions (e.g., the chroma format is 4:2:0), the video encoder and decoder may downsample the matrices and offsets of the luma block in the size ratio of the luma and chroma blocks and derive MIP matrices and offsets to be applied to the chroma block. If the video chroma format is 4:2:0, the chroma block is half the width and length of the luma block, and therefore the video encoder and the video decoder may downsample the matrices and offsets of the luma block and create ½ sized matrices and offsets to be applied to the chroma block.

As a downsampling method, the values of specific positions in a matrix of the luma block may be subsampled (for example, a reduced matrix is created from values in even or odd rows and columns), and filtering may be applied to the matrices of the luma block.

In some embodiments, to avoid complexity which may be introduced due to the derivation process of downsampled matrices and offsets, matrix-based intra prediction may be allowed for the chroma block only when the video sampling format is 4:4:4. Also, in some embodiments, matrix-based intra prediction may be allowed for blocks of chroma components (chroma blocks) only when a co-located luma block is predicted by matrix-based intra prediction (MIP). In this case, the MIP mode for the blocks of the chroma components (chroma blocks) may be considered to be the same as the MIP mode used for the co-located luma block. Furthermore, the sets of matrices and offsets used for the MIP mode of the luma block may be used for the chroma block as well.

In some embodiments, matrix-based intra prediction may be allowed for the chroma block only when the video sampling format is 4:4:4 and a single tree is used to divide a CTU.

In some other embodiments, instead of performing matrix-based intra prediction for the chroma block, a CCLM (Cross-Component Linear Model) technique may be allowed in which a prediction signal of the chroma block is generated from reconstructed values of the luma block coded by matrix-based intra prediction by using a linear model.

Temporal Matrix and Offset

The number of sets of matrices and offsets that can be used for matrix-based intra prediction (MIP) may be adaptively selected depending on the characteristics of video data. According to one aspect of the present disclosure, the video encoder may adaptively change the number of sets of matrices and offsets that can be used for matrix-based intra prediction (MIP) for each sequence, picture, or picture subgroup through RD-cost computation.

In one embodiment, N sets of matrices and offsets that can be always used in matrix-based intra prediction (MIP) regardless of the characteristics of video data may be defined in matrix-based intra prediction (MIP). Also, L sets of matrices and offsets that can be selectively used at a high level may be defined. The video encoder may select M sets (M is less than or equal to L) to be used at the current high level from among the L sets. Accordingly, the number offsets of matrices and offsets that can be determined as available for matrix-based intra prediction (MIP) at the high level is a maximum of N+L. Here, the high level's unit may be a sequence, a picture, or a picture subgroup. A set of matrices and offsets that can be selectively used may be referred to as a temporal set, and a matrix that can be selectively used may be referred to as a temporal matrix. A set of matrices and offsets that can be always used may be referred to as a basic set.

The video encoder may signal a 1-bit flag indicating whether a temporal set is further used, apart from a basic set, at the high level. If the temporal set is used, the video encoder may signal the number of temporal sets to be used at the current high level and index information of selected temporal sets in a bitstream. In an embodiment in which the same number of temporal sets is always used, the signaling of the number of temporal sets to be used at the current high level may be omitted.

When starting the decoding of a block in a new high level (e.g., new sequence), the video decoder may parse, in a high level syntax, a 1-bit flag indicating whether a temporal set is used or not. When the 1-bit flag indicates that a temporal set is used at the current high level, the video decoder may parse a syntax element indicating the number of temporal sets used at the current high level. Also, the video decoder may parse syntax elements indicating the index of each temporal set used at the current high level among predefined available temporal sets, based on the number of temporal sets used at the current high level. In performing matrix-based intra prediction on the blocks included in the high level, the video decoder may use predefined basic sets, and temporal sets selected at the high level. The video decoder may constitute a list of matrices and offsets which is made up of predefined basic sets and selected temporal sets. In the list of matrices and offsets, each temporal set may be identified by a new index.

Signaling in MIP Mode

For a coding unit (CU) coded in an intra prediction mode, a flag indicating whether an intra prediction type is matrix-based intra prediction (MIP) or not may be signaled. If matrix-based intra prediction (MIP) is applied to the coding unit, one or more syntax elements indicating an MIP mode used for the coding unit, among a plurality of available MIP modes, may be additionally signaled.

Similar to the conventional intra prediction mode (hereinafter, "regular intra prediction mode"), an MPM list may be used to represent the MIP mode used for the current coding unit. Hereinafter, for matrix-based intra prediction (MIP), a method for deriving a history-based MIP_MPM list is disclosed. In the method, MIP modes of previously coded blocks is managed in an MPM list for each block size. The MIP_MPM list is maintained and updated during an encoding/decoding process.

A plurality of MIP_MPM lists may be maintained and used according to information of at least one of block size (width and height) and signal characteristics of a block. For example, the number of available MIP modes may vary with the size of a block to which MIP is applied, and therefore a separate candidate MIP mode list may be managed for each MipSizeId={0, 1, 2}.

The MIP_MPM list is made up of M unique MIP modes, where M may be adaptively determined by at least one information among block width, height, size, and signal characteristics or may have a fixed value (e.g., 3) regardless of these information.

Each time a block is coded in an MIP mode, the MIP mode used for the block is added to the last entry of the MIP_MPM list corresponding to the block size, and when an identical mode exists in the MIP_MPM list, it may be eliminated from the MIP_MPM list or else the first entry of the MIP_MPM list may be eliminated from the MIP_MPM list.

When encountering a new slice, the MIP_MPM list may be reconfigured with predefined MIP modes. When starting the encoding/decoding of a current CTU, the MIP_MPM list may be inherited from the last block of other CTU to the left of the current CTU. When the current CTU is on the left boundary of the picture, the table may be inherited from the last block of other CTU above the current CTU.

If an MIP mode selected for the current block exists in the MIP_MPM list corresponding to the size of the current block, the video encoder may signal a 1-bit flag (e.g., MIP_HMPM_flag) of a first value indicating that the MIP mode of the current block is MPM, and may further signal a syntax element (e.g., MIP_HMPM_index) specifying one MIP mode from the MIP_MPM list corresponding to the size of the current coding block. MIP_HMPM_index may be coded with truncated binary code.

If the MIP mode selected for the current block does not exist in the MIP_MPM list corresponding to the size of the current block, the video encoder may signal a 1-bit flag (e.g., MIP_HMPM_flag) of a second value indicating that the MIP mode of the current block is not MPM, and may further signal a syntax element (e.g., MIP_HMPM_remainder) indicating one of non-MPMs other than the MPMs. MIP_HMPM_remainder may be coded with fixed length code.

If the current block is coded in an MIP mode, the decoder parses a 1-bit flag (e.g., MIP_HMPM_flag) indicating whether the MIP mode of the current block is MPM or not. If the 1-bit flag has the first value, the decoder parses a syntax element (e.g., MIP_HMPM_index) specifying one MIP mode from the MIP_MPM list corresponding to the size of the current coding block. The decoder determines an MIP mode indicated by MIP_HMPM_index in the MIP_MPM list as the MIP mode of the current block.

If a 1-bit flag (e.g., MIP_HMPM_flag) has the second value, the decoder parses a syntax element (e.g., MIP_HMPM remainder) indicating one of the remaining MIP modes (i.e., non-MPMs) other than the MPMs of the MIP_MPM list, among the MIP modes available for the size of the current block. The decoder determines a non-MPM indicated by MIP_HMPM_remainder as the MIP mode for the current block.

In other embodiments, unlike the traditional intra-prediction mode as shown in FIGS. 3A and 3B (i.e., regular intra-prediction mode), the MPM list may not be used for signaling the MIP mode. Instead, for example, one syntax element (e.g., intra_mip_mode) that indicates an MIP mode used in the current CU among the plurality of MIP modes and may be coded with a truncated binary code may be used.

A part of an exemplary coding unit syntax proposed based on the VVC draft 5 is provided below.

TABLE 5

```
if( CuPredMode[ x0 ][ y0 ] = = MODE_INTRA) {
  if( treeType = = SINGLE_TREE | | treeType = =
  DUAL_TREE_LUMA ) {
    if( sps_bdpcm_enabled_flag &&
        cbWidth <= MaxTsSize && cbHeight <= MaxTsSize )
      intra_bdpcm_flag[ x0 ][ y0 ]
    if( intra_bdpcm_luma_flag[ x0 ][ y0 ] )
      intra_bdpcm_dir_flag[ x0 ][ y0 ]
    else {
      if( sps_mip_enabled_flag &&
        ( Abs( Log2( cbWidth ) - Log2( cbHeight ) ) <= 2 &&
        cb Width <= MaxTbSizeY && cbHeight <= MaxTbSizeY )
        intra_mip_flag[ x0 ][ y0 ]
      if( intra_mip_flag ) {
        intra_mip_mode[ x0 ][ y0 ]
```

When intra_mip_flag [x0][y0] is 1, it indicates that the intra-prediction type of the current block is MIP. When intra_mip_flag [x0][y0] is 0, it indicates that the intra-prediction type of the current block is regular intra-prediction, not MIP. When intra_mip_flag [x0][y0] is not present, it may be inferred to be equal to 0. intra_mip_mode [x0][y0] indicates an MIP mode used for the current block in MIP, and is expressed as a truncated binary code.

MPM (Most Probable Mode)

In a conventional approach, intra-prediction coding employing Most Probable Mode (MPM) may be used. For example, in HEVC, a list of three MPMs is configured from the intra-prediction modes of the left and above blocks. The drawback of this method is that more modes (intra-modes other than the MPM) belong to non-MPMs that need to be coded with more bits. Several methods have been proposed to extend the number of MPMs to 3 or more entries (e.g., 6 MPM modes). However, configuring such an MPM list with more entries may require more checks and conditions, which may make implementation more complex.

In order to keep the complexity of configuration of an MPM list low, an MPM list including six MPM candidates may be configured using intra-prediction modes of a left neighboring block and an above neighboring block adjacent to the current block. The MPM candidates may include a default intra-prediction mode (e.g., a PLANAR mode), an intra-prediction mode of a neighboring block, and an intra-prediction mode derived from the intra-prediction mode of the neighboring block. When the intra-prediction mode of the neighboring block is not used (for example, when the neighboring block is inter-predicted, or the neighboring block is located in a different slice or another tile), the intra-prediction mode of the neighboring block may be set to PLANAR.

According to the type of intra-prediction mode of the mode (Left) of the left block and the mode (Above) of the above block, it is largely divided into 4 cases. When Left and Above are different from each other, and the two modes are directional modes, it may be further divided according to the difference of the Left and Above to generate an MPM list. In the table below, Max refers to the larger mode between the Left and the Above, and MIN refers to the smaller mode between the Left and the Above.

TABLE 6

| Condition | Detailed condition | MPM modes |
|---|---|---|
| Left mode and Above mode are directional mode and are the same | | {Planar, Left, Left − 1, Left + 1, Left − 2, Left + 2} |
| Left mode and Above mode are different, both modes are directional mode | Max − Min = 1 | {Planar, Left, Above, Min − 1, Max + 1, Min − 2} |
| | Max − Min ≥ 62 | {Planar, Left, Above, Min + 1, Max − 1, Min + 2} |
| | Max − Min ≤ 2 | {Planar, Left, Above, Min + 1, Min − 1, Max + 1} |
| | 2 < Max − Min < 62 | {Planar, Left, Above, Min − 1, Min + 1, Max − 1} |
| Left mode and Above mode are different, and only one of them is directional mode | | {Planar, Max, Max − 1, Max + 1, Max − 2, Max + 2} |
| Left mode and Above mode are non-directional mode (i.e., Planar or DC) | | {Planar, DC, Angular50, Angular18, Angular46, Angular54} |

The video encoder may signal a 1-bit flag (e.g., mpm_flag) indicating whether the intra-prediction mode of the current block corresponds to MPM. Typically, when the intra-prediction mode of the current block corresponds to MPM, an MPM index indicating one of 6 MPMs may be additionally signaled.

Note that in Table 6, the PLANAR mode is always included in the MPM list. That is, 6 MPMs may be divided into PLANAR and 5 non-PLANAR MPMs. Therefore, it may be efficient that the encoder first signals whether the intra-prediction mode of the current block is the PLANAR mode (e.g., using a 1-bit flag) when the intra-prediction mode of the current block corresponds to MPM, and additionally signals an MPM index indicating one of the other five non-PLANAR MPMs only when the intra-prediction mode of the current block is the same as one of the other five non-PLANAR MPMs. If the value of a bit flag (e.g., mpm_flag) indicates that the intra prediction mode of the current block corresponds to MPM, the decoder may parse a 1-bit flag indicating whether the intra prediction mode of the current block is a PLANAR mode or not.

When the intra prediction mode of the current block does not correspond to any MPM, a syntax element indicating one of the remaining 61 non-MPMs other than the 6 MPMs may be encoded using a truncated binary code.

Removal of a Mapping Table Between MIP Modes and Regular Modes

As described above, in VVC draft 5, MPM lists is used for signaling of the MIP mode and the regular mode, respectively, and a mapping table between the MIP modes and the regular modes is required to construct the MIP lists. For example, in deriving an MPM list of a block coded in the regular intra prediction mode (that is, regular blocks), when a left block or an above block is coded in matrix-based intra prediction (MIP), the MIP mode of the left block or the MIP mode of the upper block is converted into a regular intra prediction mode defined in the mapping table.

According to an aspect of the present disclosure, in deriving an MPM list for a regular block, if a left block and an upper block are coded in matrix-based intra prediction (MIP), the mode (Left) of the left block and the mode (Above) of the upper block may be considered as a predefined regular mode, regardless of which MIP mode is applied to the neighboring block. Thereby, the need for the video encoder and the video decoder to store the mapping table between the MIP modes and the regular modes in the memory is eliminated.

In some embodiments, if the left block is coded in matrix-based intra prediction (MIP), the regular intra prediction mode of the left block may be considered as a first mode (regardless of the MIP mode of the left block), and if the upper block is coded in the MIP mode, the regular intra prediction mode of the upper block may be considered as a second mode (regardless of the MIP mode of the upper block). The first mode and the second mode may be predefined to be the same or different, and may be signaled at a high level syntax.

In some other embodiments, in deriving an MPM list for a regular block, if an MIP mode is applied to a neighboring block, the regular intra prediction mode of the neighboring block may be inferred as the PLANAR mode (or DC mode) (regardless of the MIP mode of the neighboring block). Due to the characteristics of the matrix-based intra prediction (MIP) technique including an averaging operation and an interpolation operation, the residual signal of a block to which MIP is applied may have a low frequency component dominant in the transform domain. It should be noted that the characteristics of the residual signal may be similar to the residual signal of a block to which the PLANAR mode (or DC mode) is applied.

Similarly, when a chroma DM (direct mode) is derived, if matrix-based intra prediction (MIP) coding is applied to a colocated luma block, the intra prediction mode of the luma block may be inferred as the PLANAR mode (or DC mode), instead of using a mapping table between the MIP modes and the regular modes.

Accordingly, the video decoder parses a syntax element specifying an intra prediction mode for a chroma block, and the syntax element may indicate that the intra prediction mode of the chroma block employs the intra prediction mode of the co-located luma block. In such case, when MIP is applied to the co-located luma block, the video decoder may infer that the intra prediction mode of the luma block is the PLANAR mode (or DC mode). That is, when MIP is applied to a co-located luma block in the chroma direct mode (DM), the video decoder may determine that the intra prediction mode of the chroma block is the PLANAR mode (or DC mode).

However, in the chroma DM (Direct mode), if the video sampling format is 4:4:4 and the co-located luma block is predicted in matrix-based intra prediction (MIP), the matrix-based intra prediction (MIP) may be allowed for the chroma block. In this case, the MIP mode for the blocks (chroma blocks) of the chroma components may be inferred to be the same as the MIP mode used for the co-located luma block.

Figure 6:
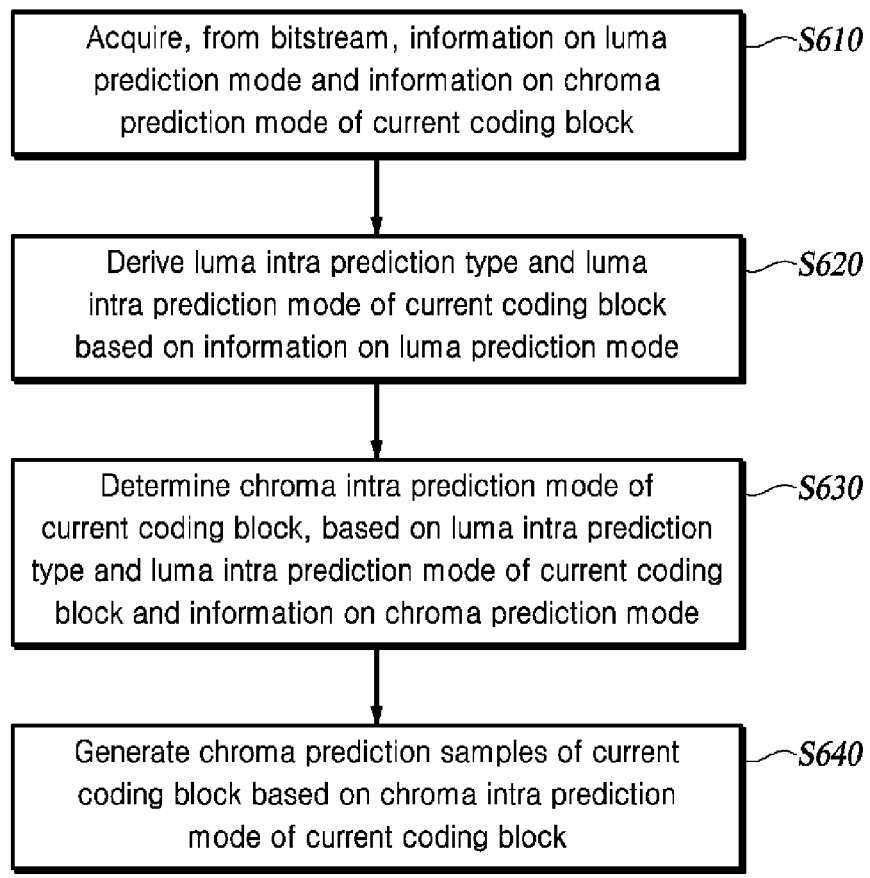
FIG. 6 is a flowchart illustrating a method of decoding video data according to an embodiment of the present disclosure.

FIG. 6 is a flowchart illustrating a method for decoding video data, which employs the above-mentioned several improvements, according to one embodiment of the present disclosure. The method of FIG. 6 may be performed by a video decoder like the video decoding apparatus illustrated in FIG. 4. For example, the entropy decoding unit 410 and the intra prediction unit 442 may be involved in one or more steps described below.

The video decoder may acquire, from a bitstream, information on a luma prediction mode of a current coding block and information on a chroma prediction mode (S610). The video decoder may decode an encoded bitstream of video data and acquire information on a luma prediction mode and information on a chroma prediction mode.

The video decoder may derive a luma intra prediction type and luma intra prediction mode of the current coding block based on the information on the luma prediction mode (S620). The luma intra prediction type may include matrix-based intra prediction (MIP) and regular intra prediction. The information on the luma prediction mode may include a syntax element indicating the luma intra prediction type of the current coding block, a syntax element indicating a matrix-based intra prediction mode selected for the current coding block, and one or more syntax elements for signaling the regular intra prediction mode selected for the current coding block.

For example, the video decoder may parse, from a bitstream, a syntax element (e.g., intra_mip_flag) indicating the luma intra prediction type of the current coding block. If the syntax element indicates that the luma intra prediction type of the current coding block is matrix-based intra prediction, the video decoder may parse a syntax element indicating a matrix-based intra prediction mode for the current coding block. The syntax element (e.g., intra_mip_mode) is represented as a truncated binary code, and specifies one of a plurality of matrix-based intra prediction modes allowed for the width and height of the current coding block.

If the syntax element (e.g., intra_mip_flag) indicates that the luma intra prediction type of the current coding block is regular intra prediction, the video decoder may derive MPM (Most Probable Mode) candidates based on the intra prediction modes of neighboring blocks adjacent to the current coding block and construct an MPM list for the current coding block, and derive a luma intra prediction mode for the current coding block based on the MPM list. To this end, the video decoder may parse one or more syntax elements related to MPM. In deriving MPM candidates based on the intra prediction modes of neighboring blocks adjacent to the current coding block, the video decoder may infer (set) the regular intra prediction mode of the neighboring blocks as a PLANAR mode if the intra prediction type of the neighboring blocks is matrix-based intra prediction.

The video decoder may determine a chroma intra prediction mode of the current coding block based on the luma intra prediction type and luma intra prediction mode of the current coding block and the information on the chroma prediction mode (S630). The information on the chroma prediction mode may include a syntax element (e.g., intra_chroma_pred_mode) specifying the chroma intra prediction mode and having a value of 0 to 4. Also, the information on the chroma prediction mode may include a flag (e.g., cclm_mode_flag) indicating whether CCLM is applied to a chroma block or not and index information (e.g., cclm_mode_idx) indicating one of three available CCLM modes. If CCLM is applied to the chroma block, intra_chroma_pred_mode may not exist.

For example, if the information on the chroma prediction mode indicates DM (Direct mode), the luma intra prediction type of the current coding block is matrix-based intra prediction, and the sampling format of the video data is 4:4:4, the video decoder may determine that the chroma intra prediction type of the current coding block is the matrix-based intra prediction, and may determine that the chroma intra prediction mode corresponding to the chroma intra prediction type of the current coding block is the same as a matrix-based intra prediction mode derived as the luma intra prediction mode of the current coding block.

For another example, if the information on the chroma prediction mode indicates DM (Direct mode), the luma intra prediction type of the current coding block is matrix-based intra prediction type, and the sampling format of the video data is 4:2:0 or 4:2:2, the video decoder may determine the chroma intra prediction mode of the current coding block is a PLANAR mode.

For still another example, if the information on the chroma prediction mode indicates DM (Direct mode) and the luma intra prediction type of the current coding block is a regular intra prediction type, the video decoder may determine that the chroma intra prediction mode of the current coding block is the same as a regular intra prediction mode derived as the luma intra prediction mode of the current coding block.

The video decoder may generate chroma prediction samples of the current coding block based on the chroma intra prediction mode of the current coding block (S640). The video decoder may generate chroma prediction samples of the current coding block by selectively performing matrix-based intra prediction or regular intra prediction.

For example, in response to a determination that the chroma intra prediction mode of the current coding block is the same as the matrix-based intra prediction mode derived as the luma intra prediction mode of the current coding block, the video decoder may generate chroma prediction samples of the current coding block by performing matrix-based intra prediction according to the derived matrix-based intra prediction mode. The video decoder may derive an input boundary vector by using neighboring chroma samples adjacent to the current coding block based on the width and height of the current coding block. The video decoder may generate chroma prediction samples for the current coding block, based on matrix-vector multiplication between the input boundary vector and a matrix predefined for the matrix-based intra prediction mode. The video decoder may derive a chroma prediction block for the current coding block based on the chroma prediction samples.

For another example, in response to a determination that the chroma intra prediction mode of the current coding block is a PLANAR mode, the video decoder may generate chroma prediction samples of the current coding block by performing regular intra prediction according to the PLANAR mode.

For still another example, in response to a determination that the chroma intra prediction mode of the current coding block is the same as a regular intra prediction mode derived as the luma intra prediction mode of the current coding block, the video decoder may generate chroma prediction samples of the current coding block by performing regular intra prediction according to the derived regular intra prediction mode.

Hereinafter, several improved technologies for inter prediction coding of video data will be disclosed. Some of the technologies to be described below are related to efficient signaling of motion information, and the other technologies are related to adaptive interpolation filtering according to the motion information.

A motion vector is an n-directional vector: that is, it may be made up of n directional components. According to a technique of the present disclosure, the motion information may be coded independently for each direction. The video encoder may signal information indicating whether motion information of a coding block is coded independently for each direction.

The motion information may refer to information explicitly signaled by the video encoder, such as a motion set for each direction, a prediction mode for the motion vector, etc. Also, the motion information may refer to or include information derived from this information, that is, the value of an actual motion vector finally obtained by the decoder or the precision of a differential motion vector. Here, the precision describes the number of digits after a decimal point that are used to express each component of a vector, and may be referred to as the resolution of a motion vector. The motion set may be comprised of information such as vector components, precision, etc. The vector components may be comprised of an actual motion vector or a differential motion vector, and the precision information may be comprised of the precision of a motion vector or the precision of a differential motion vector.

If the motion information is coded independently for each direction, this may mean that the motion set is encoded or decoded individually for each direction. For example, vector components for each direction may be expressed individually by precision values and encoded/decoded as separate motion sets. If motion information defined for each direction is coded dependently, this may mean that vector components for each of at least two of n directions may be expressed by one precision value and encoded/decoded as one motion set.

Information indicating whether motion information is coded independently or dependently for each direction may be signaled by the video encoder. For example, the information may be transmitted as a high-level syntax element such as an SEI (supplemental enhancement information) message, an APS, an SPS, a PPS, a slice/tile/tile group header, etc. For another example, the information may be transmitted for each unit of basic decoding processing or for each unit of block partitioning, or may be transmitted in both a high-level syntax and a block level. Alternatively, the information may be derived from information indicating whether motion information of reference candidate blocks is independently coded and motion information of these reference candidate blocks.

In video data which is a sequence of two-dimensional pictures, a motion vector may be comprised of two directional (e.g., x direction and y direction) components. According to a technique of the present disclosure, a motion set for the x direction and y direction may be independently coded.

In encoding of motion information, a syntax element, indicating whether each element constituting motion information may be independently coded, may be signaled at a high level. For example, the value of sps_MV_independent_enable flag indicates whether each element constituting motion information may be independently coded. If sps_MV_independent_enable equals to 1, information indicating whether each element of motion information is independently decoded for a low level such as picture/slice/tile level may be additionally signaled. For example, the value of MV_independent_flag signaled at a slice header specifies whether each element of motion information is independently decoded for a current decoding unit (e.g., CU). If MV_independent_flag equals to 0, motion information for the x direction and y direction is coded as one motion set. If MV_independent_flag=1, the motion information is coded separately for a motion set for the x direction and a motion set for the y direction.

Hereinafter, a technique for adaptive interpolation filtering using motion information will be disclosed in order to increase coding efficiency.

An interpolation filter refers to a filter used to change the resolution of a reference picture in coding technologies using motion information (for example, inter-prediction coding, an intra block copy, a CIIP technology for combining an inter-prediction signal and an intra prediction signal, etc.).

In some embodiments, configuration information for each of one or more interpolation filters to be used for interpolation may be transmitted from the video encoder to the video decoder. The configuration information of the interpolation filter may include information such as the number of tabs of the interpolation filter, coefficients of the interpolation filter, the direction of the interpolation filter, and the shape of the interpolation filter.

In other embodiments, one or more interpolation filter lists with predefined information on a plurality of interpolation filters may be used in the video encoder and the video decoder. Each list contains configuration information of each of the interpolation filters included in the list. The information on the interpolation filter may be transmitted indirectly from the encoder to the decoder. For example, an index indicating an available interpolation filter list among a plurality of interpolation filter lists may be transmitted as the information on the interpolation filter.

If a plurality of interpolation filters can be used, index information of an interpolation filter to be used among the plurality of interpolation filters may be explicitly signaled by the video encoder. For example, the index information may be transmitted as a high-level syntax element such as an SEI message, an APS, an SPS, a PPS, a slice/tile/tile group header, etc. For another example, the index information may be transmitted for each unit of basic decoding processing or for each unit of block partitioning, or may be transmitted in both a high-level syntax and a block level. Alternatively, the index information of the interpolation filter to be used for the current block may be derived from at least one of a previously decoded neighboring block, a previously decoded reference block, and a neighboring block of the previously decoded reference block.

In one embodiment, the video encoder and the video decoder may select the type of interpolation filter to be used from among available interpolation filters, depending on the position of reference pixels. Also, information on an additional interpolation filter other than predefined interpolation filters may be transmitted through a high-level syntax such as an SEI message, an APS, an SPS, a PPS, a slice/tile/tile group header, etc.

If there are several types of interpolation filters that can be used for a given position x, the encoder may signal information (e.g., filter index) specifying the interpolation filter used at that position. Such a filter index may be transmitted for each unit of basic decoding processing or for each unit of block partitioning. Alternatively, the index of an interpolation filter to be used for a given block may be derived by using decoded information for at least one of the given block, a previously decoded neighboring block, a previously decoded reference block, and a neighboring block of the previously decoded reference block. Here, the decoded information may be the precision of a motion vector, the precision of a differential motion vector, and the precision of a final motion vector.

In some possible embodiments, a syntax element indicating whether an interpolation filter may be selectively used may be signaled at a high-level syntax such as an APS, a PPS, and a slice/tile header. If an interpolation filter can be selectively used, information specifying a filter set that can be used depending on each interpolation position may be further signaled at a high-level syntax. The video decoder may define a filter by using filter information derived from a predefined filter and the high-level syntax information. The video encoder and the video decoder may derive an interpolation filter by using information such as the precision of a motion vector, the precision of a differential motion vector, the precision of a final motion vector, and the size and position of a block. The video encoder may select a suitable filter through an RD test on a number of interpolation filters that can be used and signal the index of the selected filter to the video decoder.

Also, the interpolation filter to be used for the current block may be derived from a neighboring block referred to derive a motion prediction mode of the current block and/or a motion vector of the current block.

In an exemplary embodiment, if the current block is encoded in a merge mode, the video decoder may interpolate the current block by using the same filter as the interpolation filter used for a merge block of which motion information is referred by the current block. Alternatively, the decoder may decode index information of an interpolation filter to use in perform interpolation, only with referring to motion information of the merge block.

In an exemplary embodiment, if the current block is encoded in an affine mode, the video decoder may use motion information of a neighboring reference block of the current block to derive a control point motion vector (CPMV) of the current block. In this case, the video decoder may derive an interpolation filter index of the current block by using interpolation filter index information used in the neighboring reference block. Alternatively, the video decoder may decode interpolation filter index information explicitly signaled for the current block.

In an exemplary embodiment, if the current block is encoded in PMC (pair-wise average merge candidates), interpolation filter index information of the current block may be derived by using interpolation filter index information used in reference blocks used to obtain an average value of motion vectors. Alternatively, the decoder may decode interpolation filter index information explicitly signaled for the current block.

In an exemplary embodiment, if the current block is encoded in HMVP (History based MV Prediction), an interpolation filter index of the current block may be derived by using interpolation filter index information used for a selective HMVP candidate. Alternatively, the decoder may decode interpolation filter index information explicitly signaled for the current block.

It should be understood that the above-described exemplary embodiments can be implemented in many different ways. The functions or methods described in one or more examples may be implemented in hardware, software, firmware, or any combination of the above. The functional components described in this specification have been labeled as units in order to more particularly emphasize their implementation independence.

Meanwhile, various methods or functions described in the present disclosure may be implemented with instructions stored in a non-transitory recording medium which may be read and executed by one or more processors. The non-transitory recording medium includes, for example, all types of recording devices in which data is stored in a form readable by a computer system. For example, the non-transitory recording medium includes storage media such as an erasable and programmable read only memory (EPROM), an electrically erasable and programmable read-only memory (EEPROM), a flash drive, an optical drive, a magnetic hard drive, and a solid state drive (SSD).

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method for decoding video data, the method comprising:
   acquiring, from a bitstream, information on a luma prediction mode and information on a chroma prediction mode of a current coding block;
   deriving a luma intra prediction type and luma intra prediction mode of the current coding block based on the information on the luma prediction mode, the luma intra prediction type comprising matrix-based intra prediction (MIP) and regular intra prediction;
   determining a chroma intra prediction mode of the current coding block, based on the luma intra prediction type and luma intra prediction mode of the current coding block and the information on the chroma prediction mode; and
   generating chroma prediction samples of the current coding block based on the chroma intra prediction mode of the current coding block,
   wherein, the determining of a chroma intra prediction mode of the current coding block comprises:
   if the information on the chroma prediction mode indicates a direct mode (DM), the luma intra prediction type of the current coding block is the matrix-based intra prediction, and a sampling format of the video data is 4:4:4,
   determining that the chroma intra prediction type of the current coding block is the matrix-based intra prediction, and determining that the chroma intra prediction mode corresponding to the chroma intra prediction type of the current coding block is the same as a matrix-based intra prediction mode derived as the luma intra prediction mode of the current coding block, and
   if the information on the chroma prediction mode indicates the direct mode and the luma intra prediction type of the current coding block is the regular intra prediction type,
   determining that the chroma intra prediction mode of the current coding block is the same as a regular intra prediction mode derived as the luma intra prediction mode of the current coding block,
   and wherein the deriving of a luma intra prediction type and luma intra prediction mode of the current coding block comprises:
   parsing a first syntax element indicating the luma intra prediction type of the current coding block; and
   if the syntax element indicates that the luma intra prediction type of the current coding block is the matrix-based intra prediction, parsing a second syntax element indicating the luma intra prediction mode of the current coding block.

2. A method for encoding video data, the method comprising:
   determining a luma intra prediction type and a luma intra prediction mode of a current coding block, the luma intra prediction type comprising matrix-based intra prediction (MIP) and regular intra prediction;
   encoding, into a bitstream, information on the luma intra prediction type and the luma prediction mode of the current coding block;
   determining a chroma prediction type and a chroma intra prediction mode of a current coding block based on the luma intra prediction type and the luma intra prediction mode of the current coding block;
   encoding, into a bitstream, information on the chroma prediction mode of the current coding block; and
   generating chroma prediction samples of the current coding block based on the chroma intra prediction mode of the current coding block,
   wherein, when the luma intra prediction type of the current coding block is the matrix-based intra prediction:
   if a sampling format of the video data is 4:4:4, the information on the chroma prediction mode indicating a direct mode (DM) means that the chroma intra prediction type of the current coding block is the matrix-based intra prediction and the chroma intra prediction mode of the current coding block is the same as a matrix-based intra prediction mode determined as the luma intra prediction mode of the current coding block; and
   wherein, when the luma intra prediction type of the current coding block is the regular intra prediction type, the information on the chroma prediction mode indicating the direct mode means that the chroma intra prediction mode of the current coding block is the same as a regular intra prediction mode derived as the luma intra prediction mode of the current coding block, and wherein the encoding of information on the luma intra prediction type and the luma prediction mode of the current coding block comprises:

encoding a first syntax element indicating the luma intra prediction type of the current coding block; and if the syntax element indicates that the luma intra prediction type of the current coding block is the matrix-based intra prediction, encoding a second syntax element indicating the luma intra prediction mode of the current coding block.

3. A method for providing a video decoding device with video data, the method comprising:

encoding the video data into a bitstream; and transmitting the bitstream to the video decoding device, wherein the encoding of the video data includes:

determining a luma intra prediction type and a luma intra prediction mode of a current coding block, the luma intra prediction type comprising matrix-based intra prediction (MIP) and regular intra prediction;

encoding, into a bitstream, information on the luma intra prediction type and the luma prediction mode of the current coding block;

determining a chroma prediction type and a chroma intra prediction mode of a current coding block based on the luma intra prediction type and the luma intra prediction mode of the current coding block;

encoding, into a bitstream, information on the chroma prediction mode of the current coding block; and generating chroma prediction samples of the current coding block based on the chroma intra prediction mode of the current coding block, wherein, when the luma intra prediction type of the current coding block is the matrix-based intra prediction:

if a sampling format of the video data is 4:4:4, the information on the chroma prediction mode indicating a direct mode (DM) means that the chroma intra prediction type of the current coding block is the matrix-based intra prediction and the chroma intra prediction mode of the current coding block is the same as a matrix-based intra prediction mode determined as the luma intra prediction mode of the current coding block; and wherein, when the luma intra prediction type of the current coding block is the regular intra prediction type, the information on the chroma prediction mode indicating the direct mode means that the chroma intra prediction mode of the current coding block is the same as a regular intra prediction mode derived as the luma intra prediction mode of the current coding block, and wherein the encoding of information on the luma intra prediction type and the luma prediction mode of the current coding block comprises:

encoding a first syntax element indicating the luma intra prediction type of the current coding block; and if the syntax element indicates that the luma intra prediction type of the current coding block is the matrix-based intra prediction, encoding a second syntax element indicating the luma intra prediction mode of the current coding block.

* * * * *